(12) United States Patent
Kuroiwa et al.

(10) Patent No.: US 8,931,661 B2
(45) Date of Patent: Jan. 13, 2015

(54) STRUCTURE AND MANUFACTURING METHOD FOR PRESSURE VESSEL

(75) Inventors: Natsuki Kuroiwa, Yokohama (JP); Kentaro Kono, Yokohama (JP); Takatada Usami, Yokohama (JP); Goichi Ben, Tokyo (JP); Kazuhiro Sakata, Tokyo (JP)

(73) Assignees: Nissan Motor Co., Ltd., Yokohama-shi (JP); Nihon University, Tokyo (JP)

( * ) Notice: Subject to any disclaimer, the term of this patent is extended or adjusted under 35 U.S.C. 154(b) by 371 days.

(21) Appl. No.: 13/258,986

(22) PCT Filed: Apr. 1, 2010

(86) PCT No.: PCT/JP2010/056344
§ 371 (c)(1),
(2), (4) Date: Sep. 22, 2011

(87) PCT Pub. No.: WO2010/114178
PCT Pub. Date: Oct. 7, 2010

(65) Prior Publication Data
US 2012/0012593 A1    Jan. 19, 2012

(30) Foreign Application Priority Data

Apr. 1, 2009  (JP) .................................. 2009-088874
Apr. 1, 2009  (JP) .................................. 2009-088877

(51) Int. Cl.
*B65D 6/00* (2006.01)
*B29C 70/32* (2006.01)
*F17C 1/16* (2006.01)
*B29L 31/00* (2006.01)

(52) U.S. Cl.
CPC . *B29C 70/32* (2013.01); *F17C 1/16* (2013.01); *B29L 2031/7156* (2013.01); *F17C 2209/2163* (2013.01); *Y02E 60/321* (2013.01)
USPC ..................... 220/660; 220/62.19; 220/62.11; 220/590; 220/588; 220/581; 156/195

(58) Field of Classification Search
USPC .................. 156/195; 220/581, 586, 588–590, 220/62.11, 62.19, 660
See application file for complete search history.

(56) References Cited

U.S. PATENT DOCUMENTS

| | | | |
|---|---|---|---|
| 2,370,677 A * | 3/1945 | Mapes ........................... | 220/590 |
| 2,376,831 A * | 5/1945 | Stearns ......................... | 220/586 |
| 3,300,354 A | 1/1967 | Duft | |
| 3,303,079 A * | 2/1967 | Carter ........................... | 156/172 |
| 3,765,557 A * | 10/1973 | Giwer ........................... | 220/590 |
| 4,367,189 A * | 1/1983 | Davies .......................... | 264/137 |
| 4,459,171 A * | 7/1984 | McKinney .................... | 156/425 |
| 4,905,856 A | 3/1990 | Krogager | |
| 5,362,345 A * | 11/1994 | Stettler et al. ................. | 156/173 |

(Continued)

FOREIGN PATENT DOCUMENTS

| | | |
|---|---|---|
| CN | 1546901 A | 11/2004 |
| CN | 1720411 A | 1/2006 |

(Continued)

*Primary Examiner* — Mickey Yu
*Assistant Examiner* — Brijesh V. Patel
(74) *Attorney, Agent, or Firm* — Foley & Lardner LLP

(57) ABSTRACT

A pressure vessel structure includes a vessel main body, and a grid layer provided on a periphery of the vessel main body and including a plurality of grid lines formed by intersecting strip-form raw materials so as to overlap alternately. Thus, a burst pressure of the pressure vessel is increased.

5 Claims, 15 Drawing Sheets

(56) References Cited

U.S. PATENT DOCUMENTS

| | | | |
|---|---|---|---|
| 5,499,739 A * | 3/1996 | Greist et al. | 220/589 |
| 5,526,994 A * | 6/1996 | Murphy | 220/589 |
| 5,814,386 A | 9/1998 | Vasiliev et al. | |
| 5,871,117 A * | 2/1999 | Protasov et al. | 220/592 |
| 6,547,092 B1 * | 4/2003 | Chervatsky | 220/581 |
| 7,641,949 B2 * | 1/2010 | DeLay et al. | 428/35.5 |
| 2004/0118857 A1 * | 6/2004 | Wright et al. | 220/586 |
| 2006/0099366 A1 | 5/2006 | Takemoto et al. | |
| 2007/0246461 A1 | 10/2007 | Shimadu et al. | |
| 2009/0071965 A1 * | 3/2009 | Iida et al. | 220/586 |
| 2009/0314785 A1 * | 12/2009 | Cronin et al. | 220/590 |
| 2010/0025412 A1 * | 2/2010 | Wakao | 220/590 |
| 2010/0065192 A1 * | 3/2010 | Wilson et al. | 156/180 |
| 2011/0315681 A1 * | 12/2011 | Keehan et al. | 220/62.19 |

FOREIGN PATENT DOCUMENTS

| | | |
|---|---|---|
| EP | 0 503 142 A1 | 9/1992 |
| EP | 0 958 473 A1 | 11/1999 |
| JP | 56-13458 U | 2/1981 |
| JP | 5-116232 | 5/1993 |
| JP | 08-105595 A | 4/1996 |
| JP | 2005-9559 A | 1/2005 |
| JP | 2006-300139 A | 11/2006 |
| JP | 2008045660 A * | 2/2008 |
| JP | 2008-169893 A | 7/2008 |

\* cited by examiner

STRUCTURE AND MANUFACTURING METHOD FOR PRESSURE VESSEL

TECHNICAL FIELD

This invention relates to a structure and a manufacturing method for a pressure vessel that stores hydrogen gas, natural gas, oxygen gas, or the like, and can be used in a vehicle such as a fuel cell automobile or a compressed natural gas automobile and various other types of movable and stationary bodies.

BACKGROUND ART

JP2008-169893A discloses a pressure vessel in which a lattice-shaped reinforcement layer is formed integrally with a surface of a vessel main body, leading to an improvement in shock resistance.

SUMMARY OF THE INVENTION

With the conventional pressure vessel structure described above, however, when an internal pressure becomes extremely high such that the vessel main body expands, the expansion is suppressed in parts contacted by lattice lines of the reinforcement layer, but in open parts between the lattice lines of the reinforcement layer, the surface of the vessel main body bulges out. When bending stress acts on the surface of the vessel main body in this manner, a burst pressure of the pressure vessel may not be improved as expected by providing the lattice-shaped reinforcement layer.

Further, when the reinforcement layer is formed on the conventional pressure vessel described above, first, carbon fibers impregnated with resin are provided on an outer peripheral surface of the vessel main body along an axial direction using a hand lay-up method, whereupon the resin containing fibers are hoop-wound from an outer side thereof using a filament winding method. The resin is then heat-cured. Conventionally, therefore, the lattice-shaped reinforcement layer is formed on the vessel main body, making it difficult to form a resin containing fiber layer thickly, and as a result, the lattice-shaped reinforcement layer cannot easily be formed three-dimensionally.

It is therefore an object of this invention to provide a structure and a manufacturing method for a pressure vessel with which impairment of an improvement in a burst pressure of the pressure vessel can be prevented, and a reinforcement layer (a grid layer) made of fiber can be formed three-dimensionally on a vessel main body.

To achieve this object, a pressure vessel structure according to this invention includes: a vessel main body; and a grid layer provided on a periphery of the vessel main body and including a plurality of grid lines formed by intersecting strip-form raw materials overlapped on identical lines so as to overlap alternately.

Details of this invention as well as other features and advantages thereof are set forth in the following description of the specification and illustrated in the attached drawings.

DESCRIPTION OF EMBODIMENTS

Embodiments of this invention will be described below with reference to the figures.

First Embodiment

Figure 1:
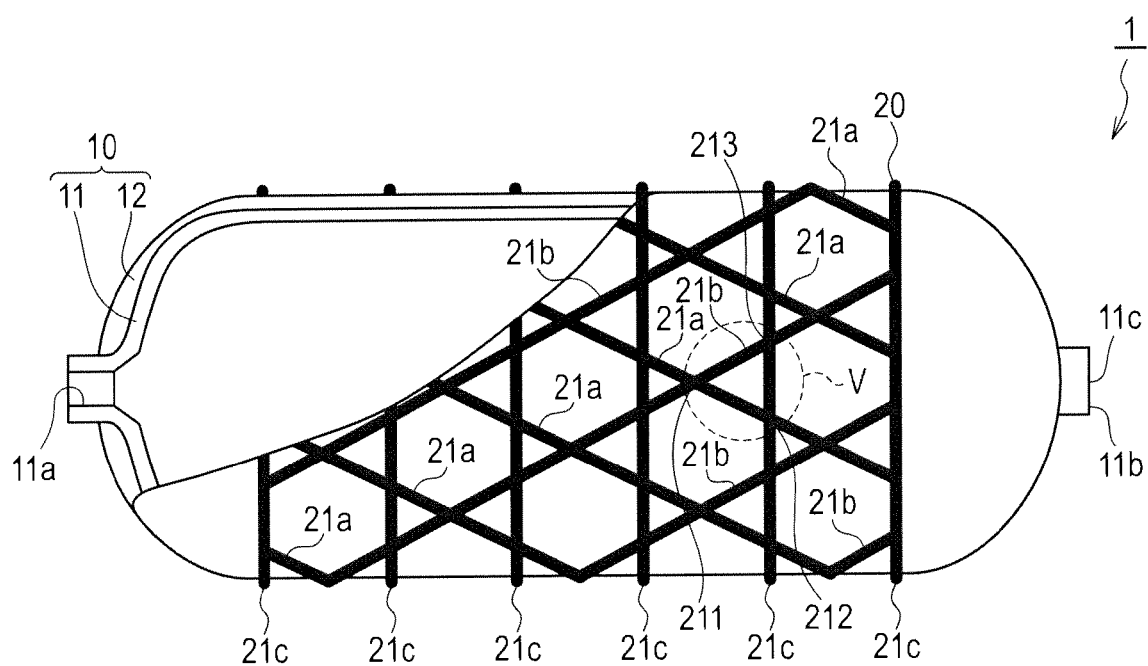
FIG. 1 is a view showing a first embodiment of a pressure vessel structure according to this invention.

FIG. 1 is a view showing a first embodiment of a pressure vessel structure according to this invention.

A pressure vessel 1 includes a vessel main body 10 and a grid layer 20.

The vessel main body 10 includes a liner 11 and a fiber reinforced plastic (FRP) layer 12.

The liner 11 is a gas storage body, the interior of which serves as a gas storage space. Liquid fuel may be stored in the storage space at normal pressure, and fuel gas may be stored in the storage space at a higher pressure than normal pressure. When the pressure vessel is used to store hydrogen gas for a fuel cell automobile, hydrogen gas is stored in the storage space at a high pressure of 35 MPa or 70 MPa, for example. It should be noted that a temperature of the liner 11 varies in accordance with a peripheral temperature, during charging and discharging of the hydrogen gas, and so on, and a variation width thereof differs according to the pressure of the hydrogen gas. The liner 11 is formed using metal, polyethylene resin, polypropylene resin, or another resin so as to possess a gas barrier property. Two or more layers of resin may be combined to realize a multilayer structure. Two openings 11a, 11b are formed in the liner 11 in an axial direction. An in-tank valve or the like through which the hydrogen gas is supplied and discharged is connected to the opening 11a. The opening 11b is closed by an end plug 11c. The opening 11b may be omitted such that the liner 11 is formed in the shape of a hemispherical shell.

The fiber reinforced plastic layer 12 is formed at a predetermined thickness to cover an outer peripheral surface of the liner 11. The fiber reinforced plastic layer 12 is formed by winding resin containing fiber around the entire region of the outer peripheral surface of the liner 11 using hoop winding, helical winding, in-plane winding, and so on. The resin containing fiber is formed by impregnating raw material fiber with a matrix resin such as epoxy resin or unsaturated polyester resin, for example. Examples of the raw material fiber include organic fiber such as metal fiber, glass fiber, and carbon fiber, synthetic organic fiber such as aramid fiber, natural fiber, and so on. These fibers may be used alone or mixed together. The thickness of the fiber reinforced plastic layer 12 is set in accordance with the material, tank shape, required performance, and so on, but there are no particular limitations thereon.

The grid layer 20 is formed by helically winding and hoop winding a strip-form raw material 21 made of resin containing fiber or the like using a filament winding method, for example. In FIG. 1, the grid layer 20 includes six first helically wound grid lines 21a, six second helically wound grid lines 21b, and six hoop wound grid lines 21c. An example of a specific manufacturing method will be described below. It should be noted that the resin containing fiber may be of an identical type or a different type to the fiber used for the fiber reinforced plastic layer 12. Further, when identical fiber is used, either an identical grade or a different grade may be employed.

Figure 2A:
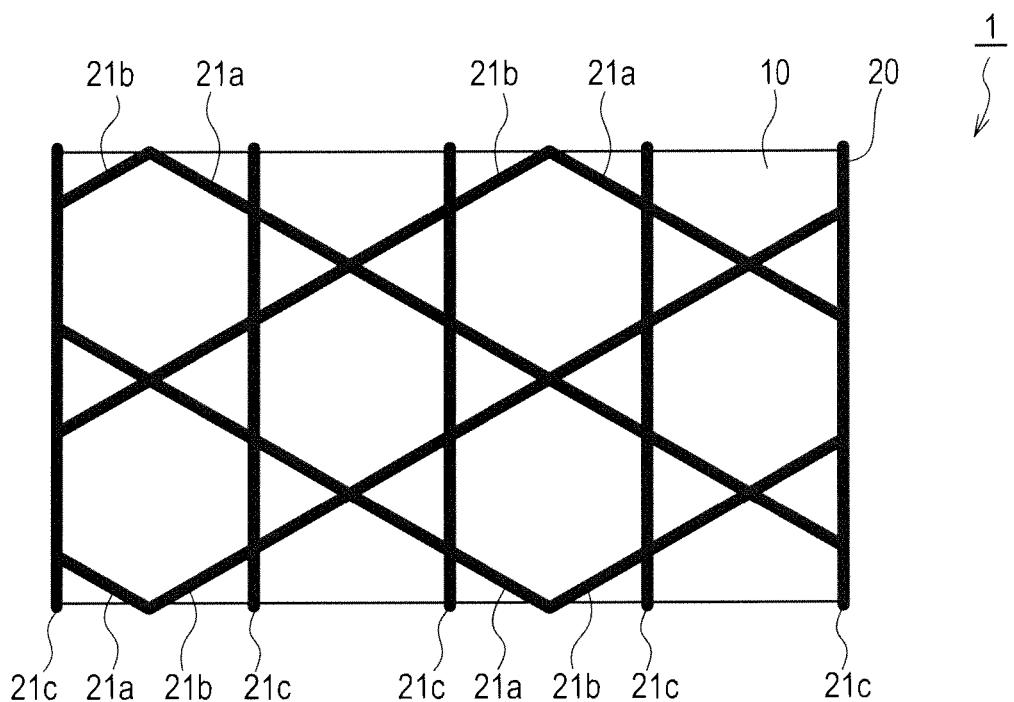
FIGS. 2A-2B are a side view and an enlarged sectional view of a pressure vessel.
Figure 2B:
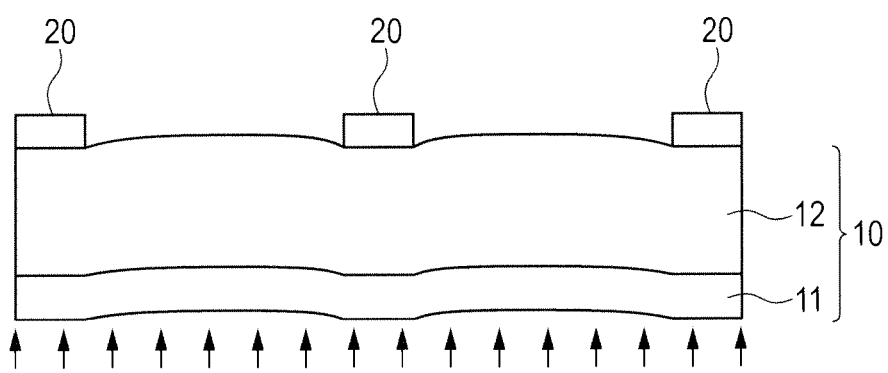

A point of this embodiment lies in a directional relationship between the grid layer (the helically wound grid lines in particular) and the resin containing fiber (it should be noted that the resin containing fiber may be formed continuously and integrally with or separately to the pre-existing fiber reinforced plastic layer 12). This point will now be described with reference to FIGS. 2A-2B. FIG. 2A is a side view of the pressure vessel, and FIG. 2B is an enlarged sectional view of the pressure vessel.

As shown in FIG. 2A, in the pressure vessel 1, the lattice-shaped grid layer 20 including the first helically wound grid lines 21a, second helically wound grid lines 21b, and hoop wound grid lines 21c is formed on a surface of the vessel main body 10. With this structure, the vessel main body 10 may expand due to an extreme increase in internal pressure. At this time, as shown in FIG. 2B, expansion of the surface of the vessel main body 10 is suppressed in parts contacted by the respective lines 21a to 21c of the grid layer 20. In open parts between the lines 21a to 21c, however, the surface of the vessel main body 10 bulges out. When bending stress acts on the vessel main body 10 in this manner, a burst pressure of the pressure vessel 1 may not be improved as expected by providing the lattice-shaped grid layer 20.

Figure 3A:
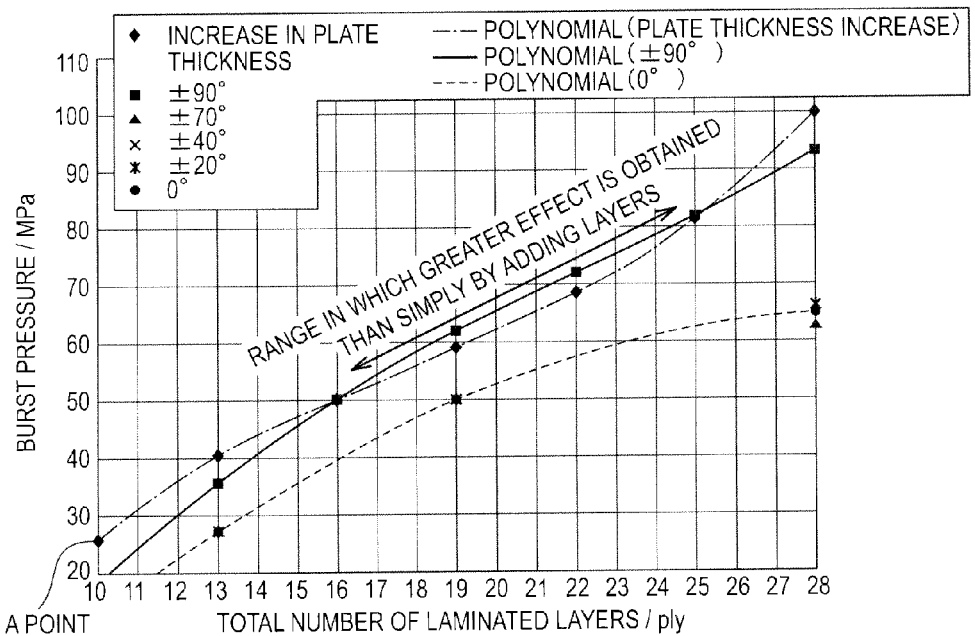
FIG. 3A is a plot showing a burst pressure of a pressure vessel in which a grid layer is formed on a periphery of a vessel main body.
Figure 3B:
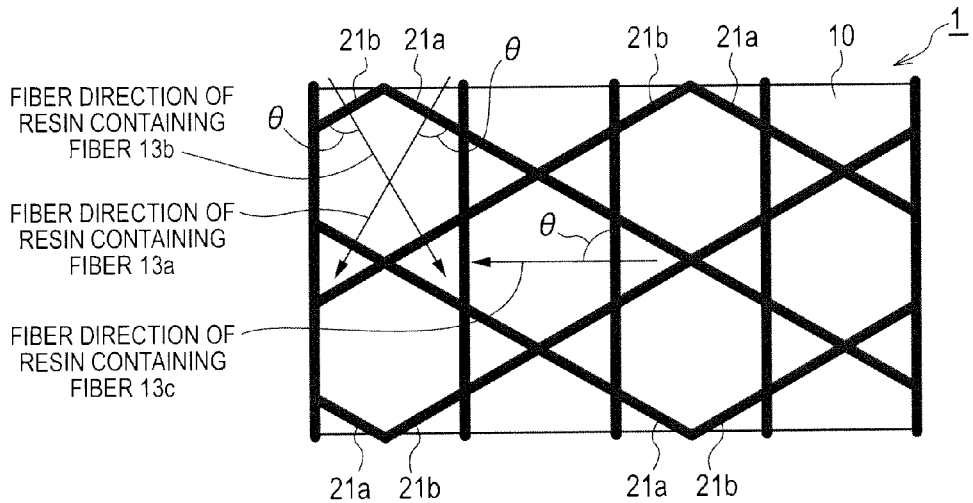
FIG. 3B is a side view of the pressure vessel of FIG. 3A.
Figure 3C:
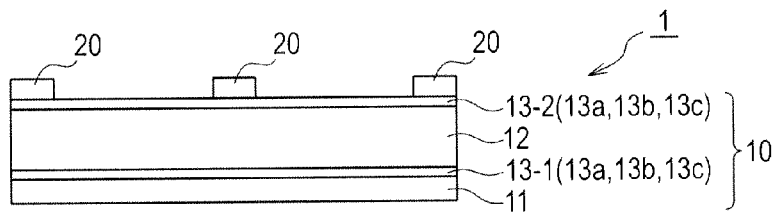
FIG. 3C is a sectional view of the pressure vessel of FIG. 3A.

Therefore, the inventors focused on varying an improvement margin of the burst pressure by varying the directional relationship between the grid layer 20 (the grid lines) and the resin containing fiber. This will now be described with reference to FIGS. 3A-3C. FIG. 3A is a view showing the burst pressure of the pressure vessel 1 in which the grid layer 20 is formed on the periphery of the vessel main body 10. FIG. 3B is a side view of the pressure vessel. FIG. 3C is a sectional view of the pressure vessel.

A dot-dash line in FIG. 3A shows the burst pressure of the pressure vessel 1, in which the grid layer 20 is formed on the vessel main body 10, in a case where the vessel main body 10 is formed by laminating additional fiber reinforced plastic layers onto the periphery of a pre-existing vessel main body formed with a total of ten laminated fiber reinforced plastic layers.

An A point indicates a base point at which the total number of laminated layers is ten and additional fiber reinforced plastic layers are not provided. At the A point, the burst pressure is approximately 27 MPa. When three additional layers are provided relative to the base point for a total of thirteen layers, the burst pressure is approximately 40 MPa. When another three layers are added for a total of sixteen layers, the burst pressure is approximately 51 MPa. When another three layers are added for a total of nineteen layers, the burst pressure is approximately 59 MPa. When another three layers are added for a total of twenty-two layers, the burst pressure is approximately 68 MPa. When another three layers are added for a total of twenty-five layers, the burst pressure is approximately 82 MPa. When another three layers are added for a total of twenty-eight layers, the burst pressure is approximately 100 MPa.

A solid line and a dotted line in FIG. 3A show the burst pressure of the pressure vessel 1, in which the grid layer 20 is formed on the vessel main body 10, in a case where the vessel main body 10 is formed as shown in FIG. 3C, i.e. by winding a fiber layer 13-1 constituted by resin containing fiber 13a, 13b, 13c having different fiber directions to the pre-existing fiber reinforced plastic layer 12 onto an inner peripheral surface of the fiber reinforced plastic layer 12, whereby a total of ten laminated fiber reinforced plastic layers 12 are formed in accordance with convention, and then additionally winding a fiber layer 13-2 constituted by resin containing fiber 13a, 13b, 13c, similarly to the fiber layer 13-1. The burst pressure was then plotted while varying an angle θ (shown in FIG. 3B) formed by the fiber direction of the resin containing fiber 13a, 13b, 13c and the first helically wound grid lines 21a, second helically wound grid lines 21b, and hoop wound grid lines 21c of the grid layer 20 between 0 degrees and 90 degrees. The solid line in FIG. 3A shows a case in which the fiber direction of the resin containing fiber 13a, 13b, 13c is orthogonal (θ=±90°) to the first helically wound grid lines 21a, second helically wound grid lines 21b, and hoop wound grid lines 21c of the grid layer 20. The dotted line in FIG. 3A shows a case in which the fiber direction of the helically wound resin containing fiber 13a, 13b, 13c is parallel (θ=0°) to the first helically wound grid lines 21a, second helically wound grid lines 21b, and hoop wound grid lines 21c of the grid layer 20.

It is evident from FIG. 3A that when the total number of laminated layers is between 16 ply and 25 ply, the burst pressure is increased to a greater extent by forming the helically wound resin containing fiber 13a in an orthogonal fiber direction to the first helically wound grid line 21a of the grid layer 20, forming the helically wound resin containing fiber 13b in an orthogonal fiber direction to the second helically wound grid line 21b, and forming the helically wound resin containing fiber 13c in an orthogonal fiber direction to the hoop wound grid line 21c (the case indicated by the solid line) than by simply providing additional fiber reinforced plastic layers 12 (the case indicated by the dot-dash line). A region of practical use corresponds precisely to a total number of laminated layers between 16 ply and 25 ply, and it can therefore be seen that in the region of practical use, the burst pressure can be increased effectively by forming the helically wound resin containing fiber 13a, 13b, 13c in an orthogonal (θ=±90°) fiber direction to the first helically wound grid lines 21a, second helically wound grid lines 21b, and hoop wound grid lines 21c of the grid layer 20.

In consideration of this point, an extension length of the helically wound resin containing fiber 13a formed in an orthogonal fiber direction to the first helically wound grid lines 21a of the grid layer 20 between the helically wound grid lines 21a is minimized. Further, an extension length of the helically wound resin containing fiber 13b formed in an orthogonal fiber direction to the helically wound grid lines 21b of the grid layer 20 between the helically wound grid lines 21b is minimized. As a result, a strength of the fiber layer 13 constituted by the resin containing fiber 13a, 13b, 13c can be maximized.

Figure 4:
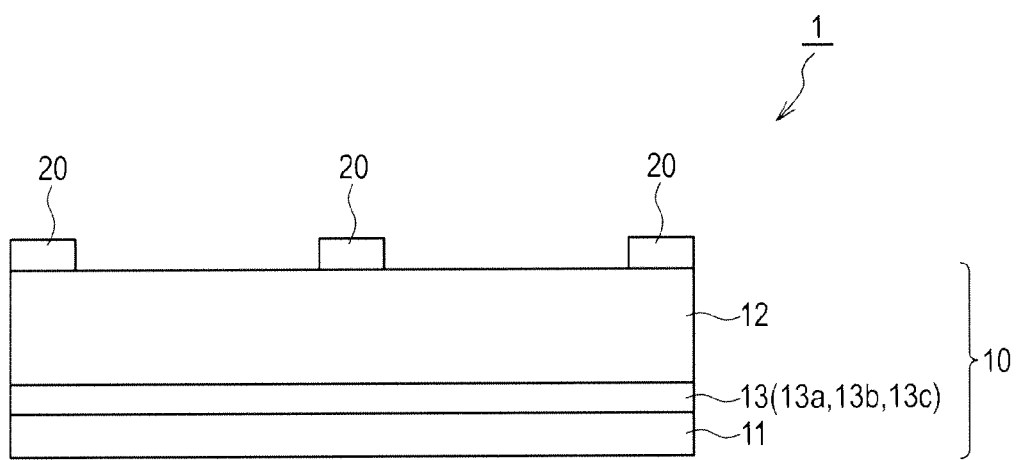
FIG. 4 is a sectional view showing the first embodiment of the pressure vessel structure according to this invention.

FIG. 4 is a sectional view showing the first embodiment of the pressure vessel structure according to this invention.

Taking the findings described above into consideration, in the pressure vessel 1 according to the first embodiment, as shown in FIG. 4, the fiber layer 13 constituted by the resin containing fiber 13a, 13b, 13c having different fiber directions to the fiber reinforced plastic layer 12 is formed by helical winding on the surface of the liner 11, and the pre-existing fiber reinforced plastic layer 12 is formed thereon.

In consideration of the findings described above, the fiber layer 13 is provided in an orthogonal ($\theta=\pm 90°$) fiber direction to the helically wound grid lines 21a, helically wound grid lines 21b, and hoop wound grid lines 21c of the grid layer 20.

Figure 5A:
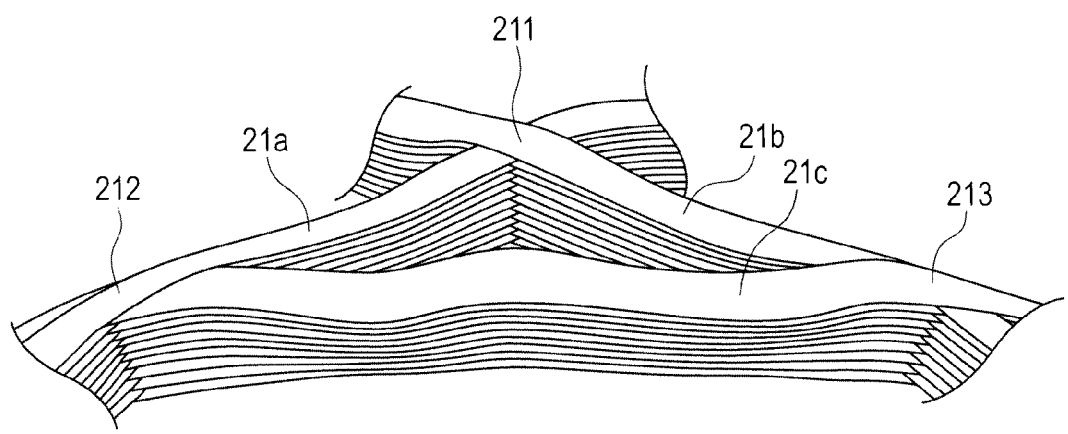
FIGS. 5A-5B are enlarged views showing a grid layer of the pressure vessel.
Figure 5B:
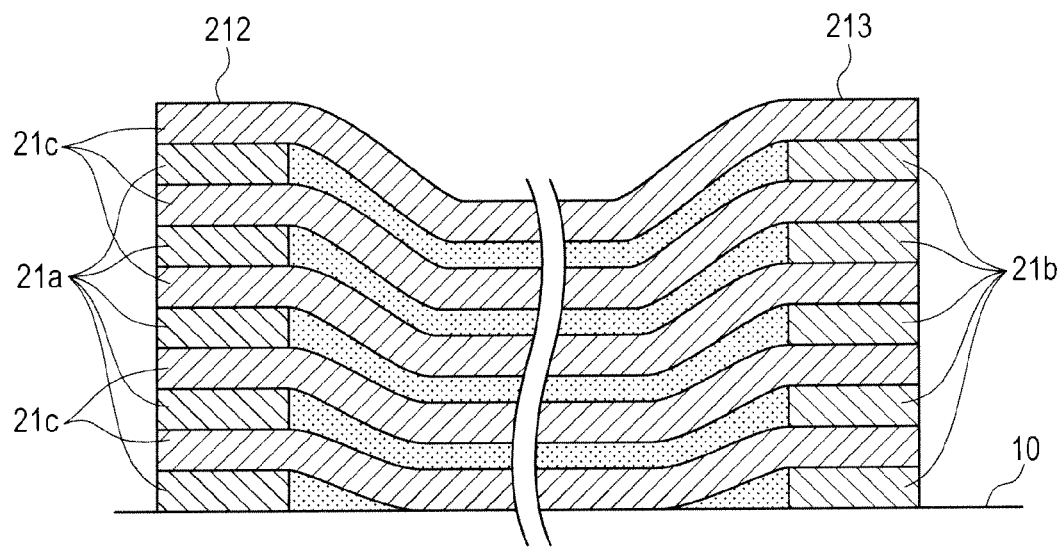

FIG. 5A is a view showing a V portion of FIG. 1 from diagonally above in the direction of an arrow. FIG. 5B is a pattern diagram showing a layer structure when the V portion of FIG. 1 is seen from the direction of the arrow.

Another point of this embodiment is that two grid lines, from the first helically wound grid line 21a, second helically wound grid line 21b, and hoop wound grid line 21c included in the grid layer 20, are formed by intersecting strip-form raw materials so as to overlap alternately, while the remaining grid line is not intersected.

More specifically, as shown in FIGS. 5A-5B, at an intersection 211, a strip-form raw material constituting the first helically wound grid line 21a and a strip-form raw material constituting the second helically wound grid line 21b intersect so as to overlap each other alternately. At an intersection 212, the strip-form raw material constituting the first helically wound grid line 21a and a strip-form raw material constituting the hoop wound grid line 21c intersect so as to overlap each other alternately. At an intersection 213, the strip-form raw material constituting the second helically wound grid line 21b and the strip-form raw material constituting the hoop wound grid line 21c intersect so as to overlap each other alternately. It should be noted that in FIG. 5B, a dotted layer sandwiched between the strip-form raw material constituting the hoop wound grid lines 21c is an epoxy resin layer. The epoxy resin layer is provided to prevent the raw material from shifting.

If the layer structure is set such that only the strip-form raw material constituting the first helically wound grid lines 21a is stacked at the intersection 211 and the strip-form raw material constituting the second helically wound grid lines 21b is stacked thereon, the second helically wound grid lines 21b become far removed from the vessel main body 10. With this structure, the second helically wound grid lines 21b do not contact the vessel main body 10 in the vicinity of the intersection 211. Therefore, with this structure, a contact area between the second helically wound grid lines 21b and the vessel main body 10 decreases, leading to an increase in stress in the contact parts.

In this embodiment, on the other hand, two grid lines from the first helically wound grid line 21a, second helically wound grid line 21b, and hoop wound grid line 21c included in the grid layer 20 are formed by intersecting strip-form raw materials so as to overlap alternately. Therefore, a reduction in the contact area of upper layer grid lines can be prevented, enabling an increase in the burst pressure.

Next, referring to FIGS. 6A-6F, a specific manufacturing method for the grid layer will be described.

A pressure vessel manufacturing method according to this embodiment includes a preparatory step #101, a grid layer formation step #102, a die removal step #103, and a main body insertion step #104. Each of these steps will be described in detail below.

Figures 6A, 6B:
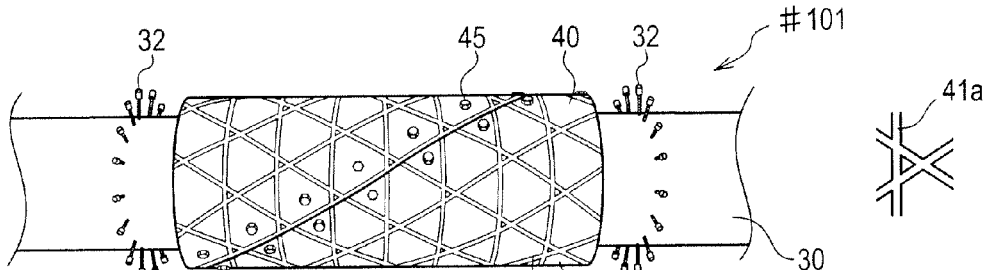
FIGS. 6A-6F are views illustrating a specific manufacturing method for the grid layer according to this embodiment.

(Preparatory Step #101; FIGS. 6A-6B)

Pins 32 are provided in two rows on a surface 31 of a cylindrical mandrel 30 so as to stand upright at predetermined intervals. A die 40 is wound between the two rows of pins 32, and end edge portions of the die 40 are fixed by bolts 45. The pins 32 may be bolts that are screwed into screw holes formed in the mandrel 30, for example, so as to be freely detachable. The die 40 is formed from silicone. Grooves 41a are formed in a surface 41 of the die 40. As shown in the enlargement of FIG. 6B, hoop winding grooves of the grooves 41a are formed at an offset so as not to overlap an intersection between helical winding grooves. Further, the die 40 is a parallelogram in an open state, and when wound around the mandrel 30, a seam thereof forms one of the helical winding grooves. A depth of the groove parts is substantially constant such that an inner peripheral surface of the grid layer 20 is concentric with an outer peripheral surface of the vessel main body 10 when fitted in the main body insertion step #104.

Figure 6C:
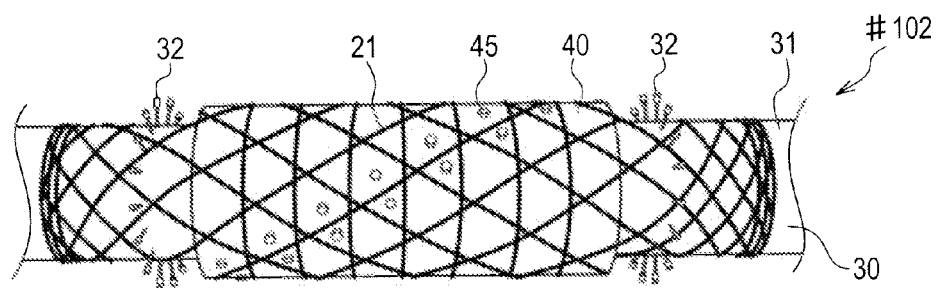

(Grid Layer Formation Step #102; FIG. 6C)

A strip-form raw material 21 such as resin containing fiber is engaged with the pins 32 and then helically wound and hoop wound around the die 40 in alignment with the grooves 41a using a filament winding method, for example. In this state, the die 40 is placed in a curing oven where the raw material 21 is cured. As a result, the grid layer 20 is formed. As described above, the hoop winding grooves are offset on the surface of the die 40 so as not to overlap the intersections between the helical winding grooves, and therefore the hoop-wound raw material is wound in offset positions not overlapping the intersections of the helically wound raw material. Further, the resin containing fiber is formed by impregnating raw material fiber with a matrix resin such as epoxy resin or unsaturated polyester resin, for example. Examples of the raw material fiber include organic fiber such as metal fiber, glass fiber, and carbon fiber, synthetic organic fiber such as aramid fiber, natural fiber, and so on.

Figures 6D, 6E:
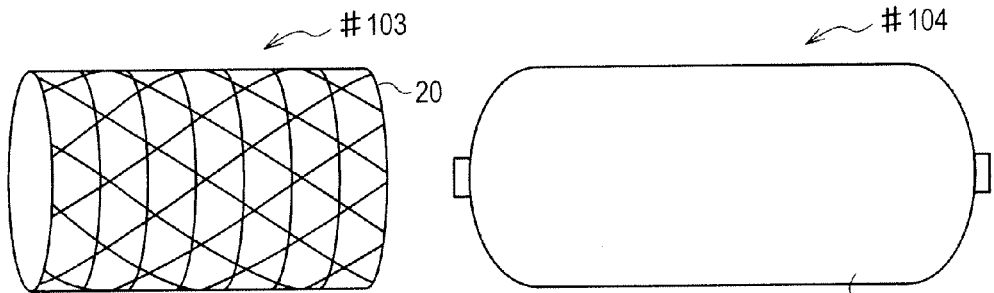

(Die Removal Step #103; FIG. 6D)

The pins 32 and bolts 45 are then removed from the mandrel 30. Next, the mandrel 30 is withdrawn from the grid layer 20. The silicone die 40 is then extracted from the interior of the grid layer 20. Thus, the die 40 is removed from the grid layer 20.

(Main Body Insertion Step #104; FIG. 6E)

The vessel main body 10 is then inserted into the grid layer 20 from which the die 40 has been removed. The vessel main body 10 is formed by covering the periphery of the liner 11 with the fiber reinforced plastic layer 12. The liner 11 is a gas storage body formed using metal, polyethylene resin, polypropylene resin, or another resin, for example, so as to possess a gas barrier property. Two or more layers of resin may be combined to realize a multilayer structure, whereupon the resin is cured. The fiber reinforced plastic layer 12 is an FRP layer formed by hoop-winding raw material fiber impregnated with a matrix resin such as epoxy resin or unsaturated polyester resin, for example, around an outer peripheral surface of a trunk portion 101 of the liner 11 (a cylindrical part of the liner 11) and winding the raw material fiber around the entire region of the outer peripheral surface of the liner using helical winding, in-plane winding, or the like. Examples of the raw material fiber include organic fiber such as metal fiber, glass fiber, and carbon fiber, synthetic organic fiber such as aramid fiber, natural fiber, and so on. The thickness of the fiber reinforced plastic layer 12 is set in accordance with the material, tank shape, required performance, and so on, but there are no particular limitations thereon.

Figure 6F:
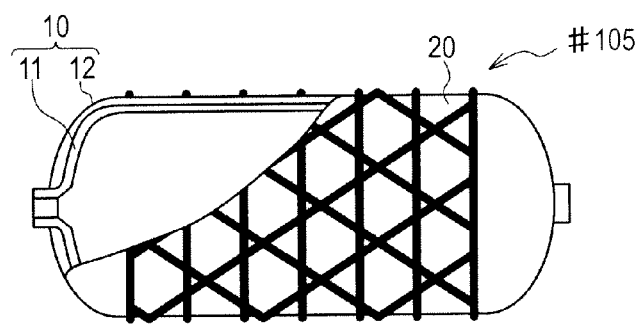

Through the steps described above, the pressure vessel is completed (#105; FIG. 6F). It should be noted that the grid layer 20 and the vessel main body 10 may be integrated by burying resin, FRP, or the like into gaps after inserting the vessel main body 10 into the grid layer 20. Alternatively, the grid layer 20 and vessel main body 10 may be left as is without filling the gaps. For example, the gaps may be set to be filled when the vessel main body 10 rises to or above atmospheric pressure and to or below a normal use pressure or to be filled when the vessel main body 10 rises to or above a pressure cycle test pressure and to or below a bursting test pressure.

By forming the grid layer 20 using the grooves 41a of the die 40 fixed to the mandrel 30 and the pins 32 standing upright on the mandrel 30 in this manner, the shape of the grid layer 20 (in particular, the shapes of the helically wound grid lines 21a, helically wound grid lines 21b, and hoop wound grid lines 21c) can be formed accurately. By determining the fiber direction of the resin containing fiber 13a, 13b, 13c in accordance with the shape of the grid layer 20, bending stress acting on the vessel main body 10 between the grid layer 20 and the vessel main body 10 can be alleviated, and as a result, impairment of an improvement in the burst pressure of the pressure vessel can be prevented.

Further, in this embodiment in particular, the fiber layer 13 is added to the inner peripheral surface of the fiber reinforced plastic layer 12. In so doing, bending stress on an innermost layer of the fiber reinforced plastic layer 12, where bursting is likely to occur, can be alleviated, and as a result, impairment of an improvement in the burst pressure of the pressure vessel can be prevented effectively.

Furthermore, this embodiment is constituted such that the helically wound resin containing fiber 13a formed in an orthogonal fiber direction to the first helically wound grid lines 21a of the grid layer 20, the helically wound resin containing fiber 13b formed in an orthogonal fiber direction to the second helically wound grid lines 21b, and the helically wound resin containing fiber 13c formed in an orthogonal fiber direction to the hoop wound grid lines 21c are provided continuously on the inner peripheral surface of the fiber reinforced plastic layer 12. Moreover, the helically wound resin containing fiber 13a and the helically wound resin containing fiber 13b are formed continuously in a thickness direction of a wall surface of the pressure vessel. Hence, bending stress alleviated by the helically wound resin containing fiber on a lower layer side is alleviated further by the helically wound resin containing fiber forming an upper layer, and therefore impairment of an improvement in the burst pressure of the pressure vessel can be prevented even more effectively.

Furthermore, according to this embodiment, the fibrous raw material is wound around the die 40 attached to the mandrel 30 in alignment with the grooves 41a, and therefore the fiber raw material layer can be increased in thickness simply. As a result, the grid layer can be formed three-dimensionally without difficulty.

Moreover, in this embodiment, the grooves 41a of the die 40 fixed to the mandrel 30 and the pins 32 standing upright on the mandrel 30 are used, and therefore a positioning precision of the raw material fiber is improved. As a result, a three-dimensional grid layer can be formed even more easily.

Further, in this embodiment, the inner peripheral surface of the grid layer 20 and the outer peripheral surface of the vessel main body 10 are formed concentrically. Hence, when the vessel main body 10 expands due to an increase in internal pressure, the outer peripheral surface of the vessel main body 10 comes into surface contact with the inner peripheral surface of the grid layer 20 substantially evenly, and therefore locally concentrated stress can be alleviated.

Furthermore, the hoop winding grooves are formed in the die at an offset so as not to overlap the intersections between the helical winding grooves, and the raw material is wound into the grooves such that the hoop-wound raw material is offset from the intersections between the helically wound raw material. As a result, partial concentration of the raw material thickness can be avoided, and stress acting on the raw material can be dispersed.

Moreover, according to this embodiment, two grid lines from the first helically wound grid line 21a, second helically wound grid line 21b, and hoop wound grid line 21c included in the grid layer 20 are formed by intersecting strip-form raw materials so as to overlap alternately.

If the layer structure is set such that only the strip-form raw material constituting the first helically wound grid lines 21a is stacked at the intersections and the strip-form raw material constituting the second helically wound grid lines 21b is stacked thereon, the second helically wound grid lines 21b become far removed from the vessel main body 10. With this structure, the second helically wound grid lines 21b do not contact the vessel main body 10 in the vicinity of the intersections. Therefore, with this structure, the contact area between the second helically wound grid lines 21b and the vessel main body 10 decreases, leading to an increase in stress in the contact parts.

In this embodiment, on the other hand, two grid lines from the first helically wound grid line 21a, second helically wound grid line 21b, and hoop wound grid line 21c included in the grid layer 20 are formed by intersecting strip-form raw materials so as to overlap alternately. Therefore, a reduction in the contact area of the upper layer grid lines can be prevented, and stress can be dispersed. As a result, the burst pressure can be increased effectively.

Second Embodiment

Figure 7:
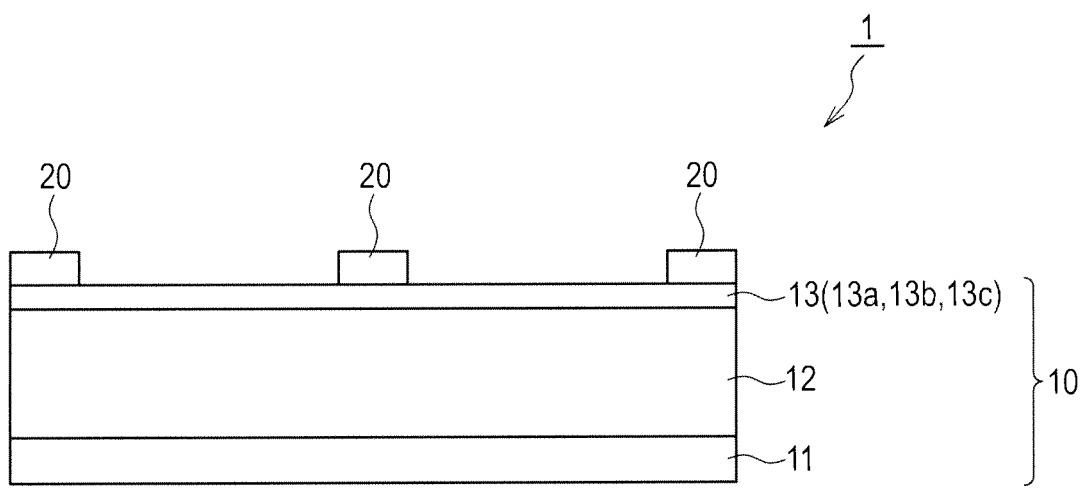
FIG. 7 is a sectional view showing a second embodiment of the pressure vessel structure according to this invention.

FIG. 7 is a sectional view showing a second embodiment of the pressure vessel structure according to this invention.

In this embodiment, the vessel main body 10 is formed by providing the fiber layer 13 on the surface of a pre-existing vessel main body in which the pre-existing fiber reinforced plastic layer 12 is formed on the liner 11. In so doing, there is substantially no need to modify a conventionally employed manufacturing line, and therefore an increase in manufacturing cost can be suppressed.

Further, in this embodiment, the fiber layer 13 is formed by providing the helically wound resin containing fiber 13a formed in an orthogonal fiber direction to the first helically wound grid lines 21a of the grid layer 20, the helically wound resin containing fiber 13b formed in an orthogonal fiber direction to the second helically wound grid lines 21b, and the helically wound resin containing fiber 13c formed in an orthogonal fiber direction to the hoop wound grid lines 21c continuously on the outer peripheral surface of the fiber reinforced plastic layer 12. Likewise with this constitution, the bending stress alleviated by the helically wound resin containing fiber on the lower layer side is further alleviated by the helically wound resin containing fiber forming the upper layer, and therefore impairment of an improvement in the burst pressure of the pressure vessel can be prevented even more effectively.

Third Embodiment

Figure 8:
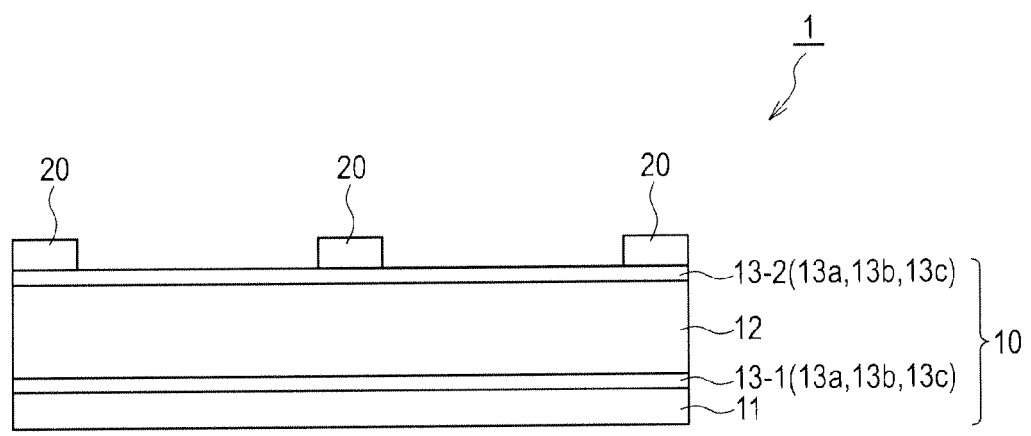
FIG. 8 is a sectional view showing a third embodiment of the pressure vessel structure according to this invention.

FIG. 8 is a sectional view showing a third embodiment of the pressure vessel structure according to this invention.

In this embodiment, the vessel main body 10 is manufactured by forming the fiber layer 13-1 on the surface of the liner 11, forming the pre-existing fiber reinforced plastic layer 12 thereon, and forming the fiber layer 13-2 thereon. It should be noted that this structure is similar to the structure used in the burst pressure experiment, shown in FIG. 3C.

The bending stress acting on the vessel main body 10 is greatest on an outermost layer and an innermost layer relative to a neutral plane. This bending stress can be alleviated by the fiber layer 13-1 provided on the innermost layer of the fiber reinforced plastic layer 12 and the fiber layer 13-2 provided on the outermost layer, and therefore impairment of an improvement in the burst pressure of the pressure vessel can be prevented even more effectively.

Fourth Embodiment

Figure 9:
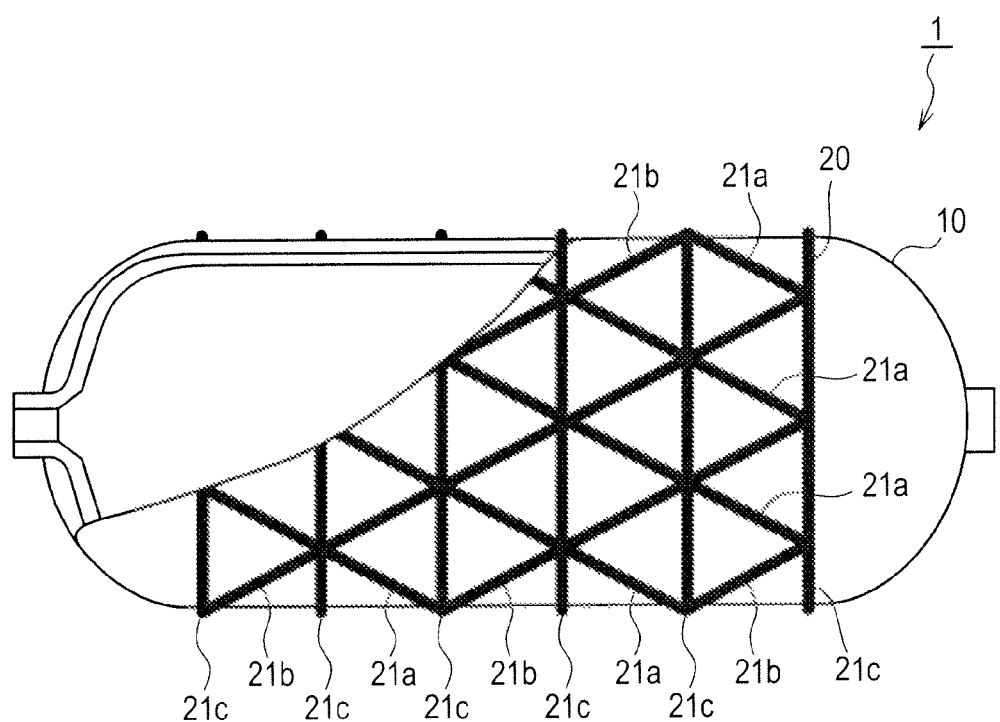
FIG. 9 is a view showing a fourth embodiment of the pressure vessel structure according to this invention.

FIG. 9 is a view showing a fourth embodiment of the pressure vessel structure according to this invention.

As a variation of the grid layer 20, as shown in FIG. 9, for example, the three grid lines included in the grid layer 20, namely the first helically wound grid line 21a, the second helically wound grid line 21b, and the hoop wound grid line 21c, may be formed by intersecting strip-form raw materials so as to overlap alternately.

In this case also, the resin containing fiber 13a, 13b, 13c may be formed in an orthogonal fiber direction to the helically wound grid lines 21a and the helically wound grid lines 21b of the grid layer 20.

With this constitution, the entire grid layer contacts the vessel main body 10 at equal periods, and therefore a favorable balance is obtained in relation to stress, leading to an improvement in the burst pressure of the pressure vessel. Further, a circumferential direction force can be assisted by the helically wound grid lines, and therefore an amount of raw material required for the hoop wound grid lines can be reduced.

Fifth Embodiment

Figure 10:
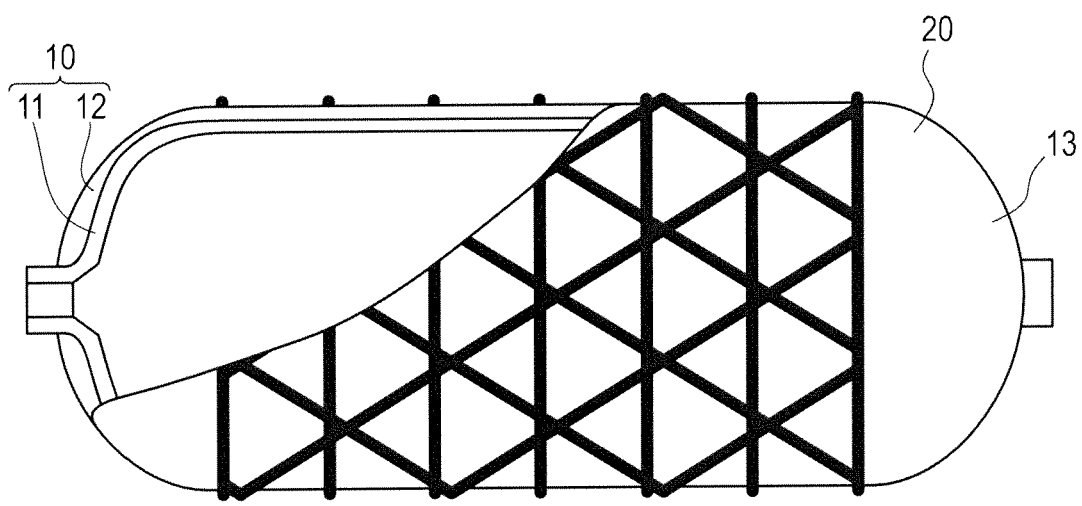
FIG. 10 is a view showing a fifth embodiment of the pressure vessel structure according to this invention.

FIG. 10 is a view showing a fifth embodiment of the pressure vessel structure according to this invention.

As described above, with a type where the three grid lines included in the grid layer 20, namely the first helically wound grid line 21a, the second helically wound grid line 21b, and the hoop wound grid line 21c, are formed by intersecting strip-form raw materials so as to overlap alternately, a favorable balance is obtained in relation to stress, leading to an improvement in the burst pressure of the pressure vessel. However, the thickness of the intersections is triple that of other parts. Therefore, this type is suitable for a case in which the number of layers of the wound raw material is small so that concentrated thickness in the raw material does not pose a problem or a case in which a required strength is low so that there is little need to disperse the stress acting on the raw material. When the number of layers of the wound raw material is large, on the other hand, and the three grid lines are overlapped in a single location, the size of the pressure vessel 1 increases. Further, the contact area between the outermost grid line and the vessel main body 10 decreases.

Hence, in this embodiment, rather than overlapping the three grid lines in a single location, two grid lines are overlapped as close to the third grid line as possible.

In so doing, the size of the pressure vessel 1 does not increase even when the number of layers of the wound raw material is large, and therefore a favorable overall balance can be obtained without reducing the contact area between the grid layer and the vessel main body 10.

Sixth Embodiment

Figure 11:
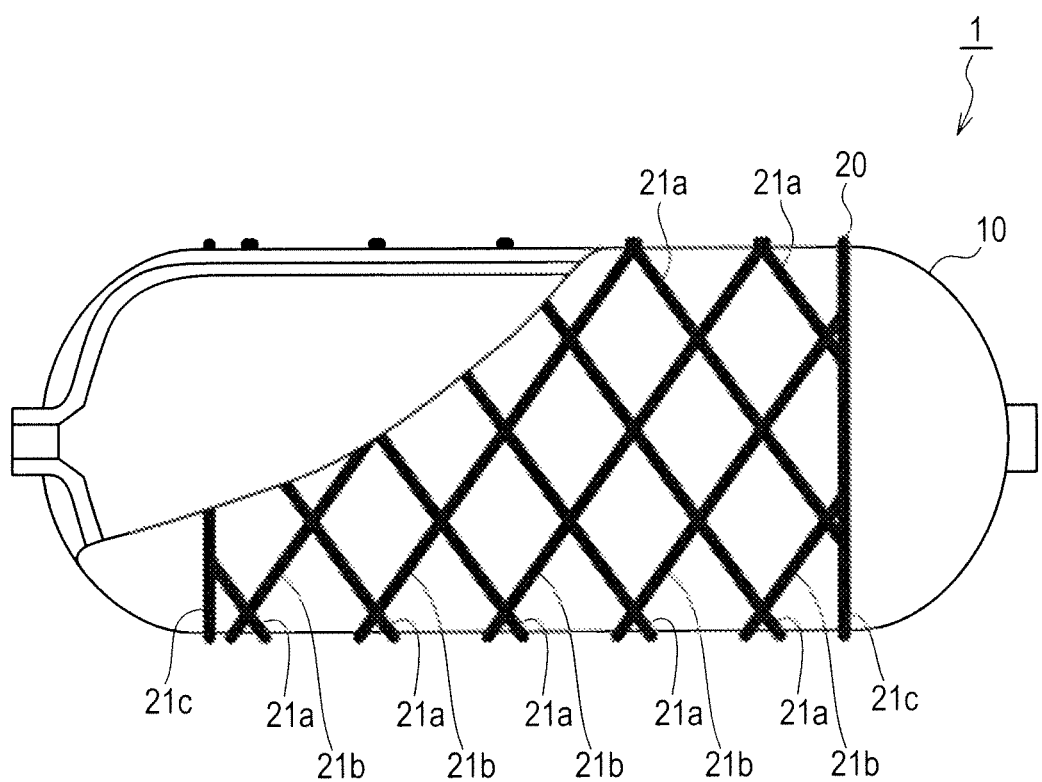
FIG. 11 is a view showing a sixth embodiment of the pressure vessel structure according to this invention.

FIG. 11 is a view showing a sixth embodiment of the pressure vessel structure according to this invention.

This embodiment differs from the first embodiment in that the hoop wound grid line 21c is provided only on respective ends and removed from other locations. In other words, in this embodiment, the hoop wound grid line 21c is formed on either end, while the first helically wound grid lines 21a and the second helically wound grid lines 21b are formed therebetween.

In this case also, the resin containing fiber 13a, 13b, 13c may be formed in an orthogonal fiber direction to the helically wound grid lines 21a, helically wound grid lines 21b, and hoop wound grid lines 21c of the grid layer 20.

With this constitution, the number of grid lines can be reduced, enabling a reduction in manufacturing cost.

Seventh Embodiment

Figure 12:
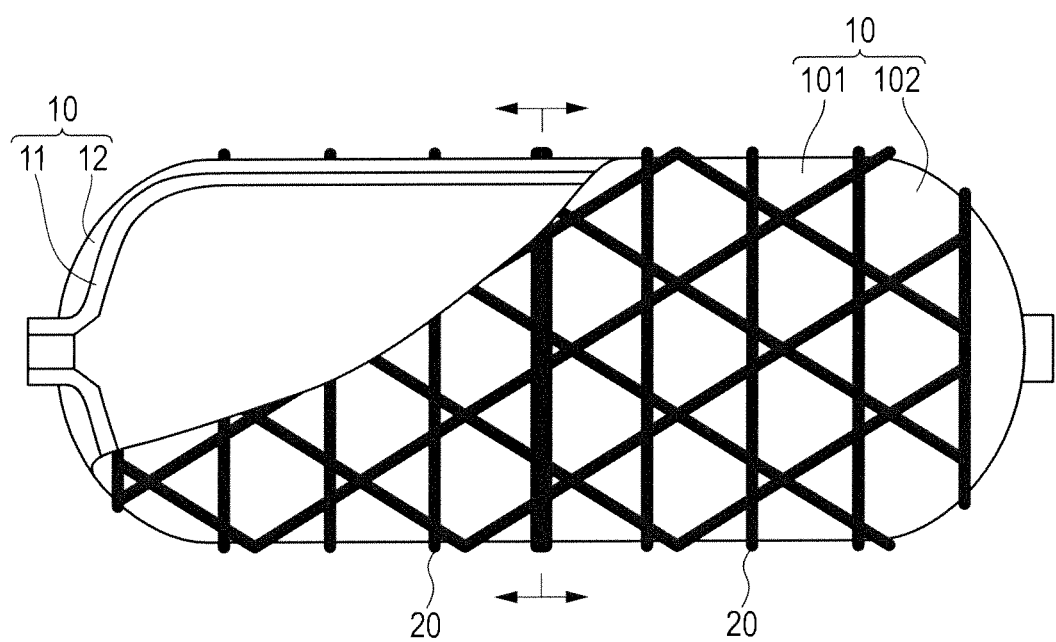
FIG. 12 is a view showing a seventh embodiment of the pressure vessel structure according to this invention.

FIG. 12 is a view showing a seventh embodiment of the pressure vessel structure according to this invention.

In this embodiment, the grid layer 20 including the first helically wound grid lines 21a, second helically wound grid lines 21b, and hoop wound grid lines 21c is provided on at least a part of a hemispherical shell-shaped portion 102 of the vessel main body 10 in addition to the trunk portion 101. In this case, the grid layer 20 may be formed in two parts that are inserted respectively from the left and right of the vessel main body 10 and joined in the middle.

When high-pressure gas is charged, the vessel main body may also expand in the axial direction. In particular, when an outer shell made of fiber reinforced plastic (FRP) is formed on the periphery of the liner 11, the fiber reinforced plastic layer 12 wound around the liner 11 using the filament winding method is hoop-wound and helically wound around the trunk portion, but only helically wound and not hoop-wound around the hemispherical shell-shaped portion. Therefore, focusing on the hemispherical shell-shaped portion, the absence of hoop winding in the vicinity of the trunk portion leads to a reduction in the thickness of the fiber layer, and as a result, the vessel main body is particularly likely to expand in the axial direction. It should be noted that in the vicinity of a ferrule, the surface area is small, and therefore the fiber layer is thick even without hoop winding. Hence, the vicinity of the trunk portion is particularly likely to expand.

According to this embodiment, however, the grid layer 20 including the first helically wound grid lines 21a, second helically wound grid lines 21b, and hoop wound grid lines 21c is provided on at least a part of the hemispherical shell-shaped portion 102, and therefore deformation caused by axial direction expansion of the vessel main body is suppressed.

Further, since the fiber reinforced plastic layer 12 is hoop-wound and helically wound around the trunk portion but only helically wound and not hoop-wound around the hemispherical shell-shaped portion, as described above, a space corresponding to the absent hoop winding is formed between the helically wound layers in the hemispherical shell-shaped portion in the vicinity of the trunk portion. When the liner is made of resin, high-pressure gas may permeate the liner and accumulate in this space.

According to this embodiment, however, the grid layer 20 including the first helically wound grid lines 21a, second helically wound grid lines 21b, and hoop wound grid lines 21c is provided on at least a part of the hemispherical shell-shaped portion 102, and therefore the grid layer 20 presses against this space, thereby preventing the accumulation of permeated gas.

Eighth Embodiment

Figure 13A:
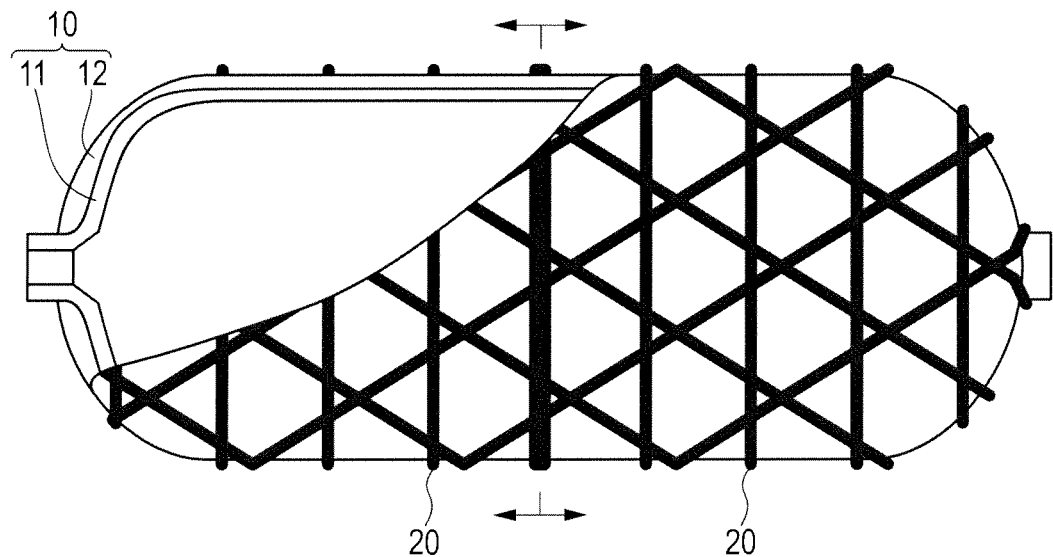
FIGS. 13A-13B are views showing an eighth embodiment of the pressure vessel structure according to this invention.
Figure 13B:
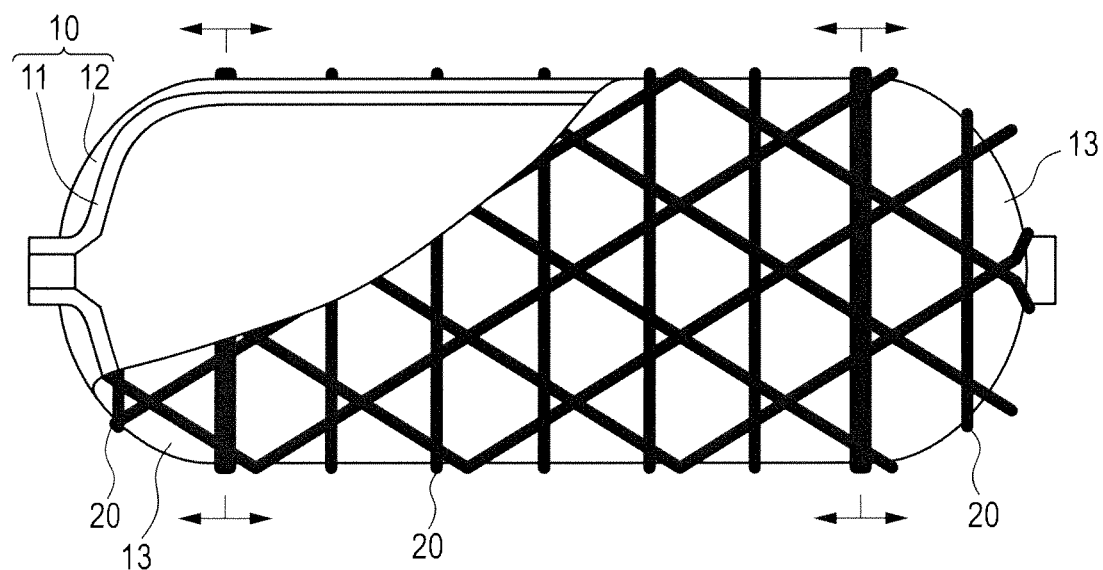

FIGS. 13A-13B are views showing an eighth embodiment of the pressure vessel structure according to this invention.

In this embodiment, the first helically wound grid line 21a, second helically wound grid line 21b, and hoop wound grid line 21c extend to cover the hemispherical shell-shaped part of the vessel main body 10. In this case, the grid layer 20 may be formed in two parts that are inserted respectively from the left and right of the vessel main body 10 and joined in the middle.

In this case also, the resin containing fiber 13a, 13b, 13c may be formed in an orthogonal fiber direction to the helically wound grid line 21a, helically wound grid line 21b, and hoop wound grid line 21c of the grid layer 20.

With this constitution, deformation occurring when the high-pressure gas is charged can be prevented even further.

Moreover, as shown in FIG. 13B, a three-part type may be provided by inserting the grid layer 20 into the hemispherical shell-shaped parts 102 on both the left and right sides in addition to the grid layer 20 that is formed on the pressure vessel as shown in FIG. 6F through the steps of FIGS. 6A to 6F, and then joining the three parts.

Ninth Embodiment

Figure 14:
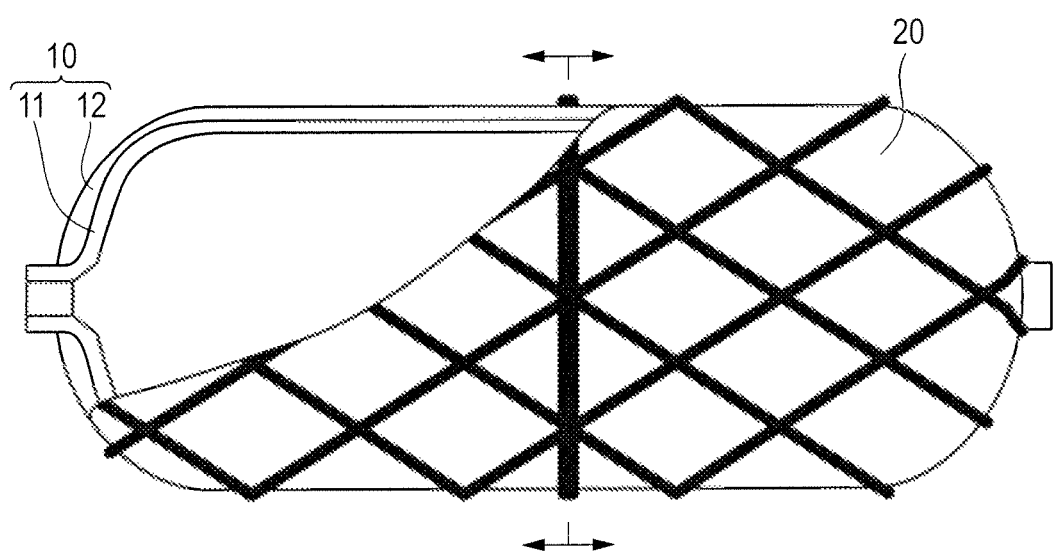
FIG. 14 is a view showing a ninth embodiment of the pressure vessel structure according to this invention.

FIG. 14 is a view showing a ninth embodiment of the pressure vessel structure according to this invention.

This embodiment differs from the eighth embodiment shown in FIG. 13A in that the hoop wound grid line 21c is provided only in a joint part and removed from other locations.

With this constitution, the number of grid lines can be reduced, enabling a reduction in manufacturing cost.

This invention is not limited to the embodiments described above, and may be subjected to various amendments and modifications within the scope of the technical spirit thereof, such amendments and modifications needless to say being included in the technical scope of the invention.

For example, the fiber layer 13 constituted by the resin containing fiber 13a, 13b, 13c may be formed integrally and continuously with or separately to the pre-existing fiber reinforced plastic layer 12.

Further, the grooves 41a in the die 40 may be formed in various shapes, and the formed grid layer 20 may also be provided in various forms.

Figure 15A:
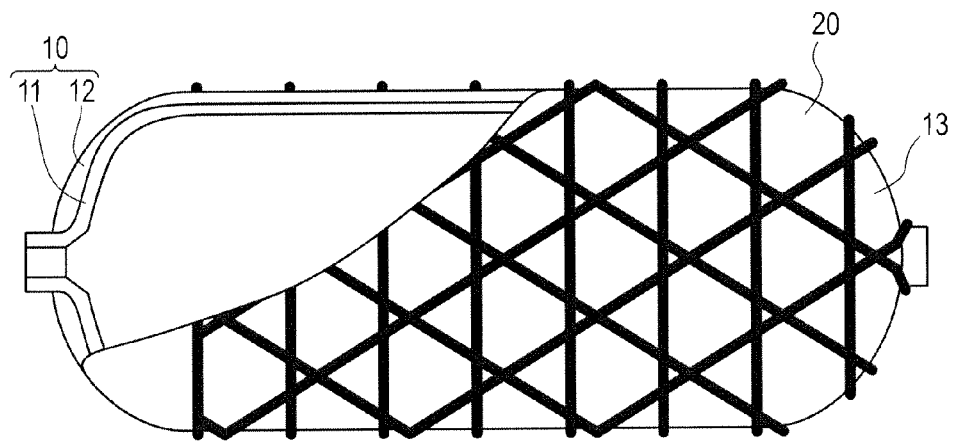
FIGS. 15A-15B are views showing other embodiments of the pressure vessel structure according to this invention.

As shown in FIG. 15A, the grid layer 20 may also be formed on one (a right side in FIG. 15A) of the hemispherical shell-shaped portions 102 of the vessel main body 10.

Figure 15B:
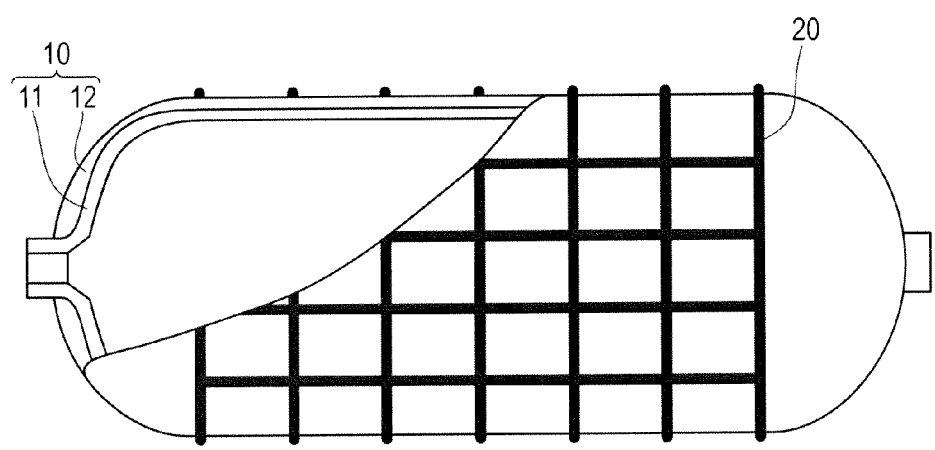

Further, when aligning the resin containing fiber raw material with the grooves 41a in the die 40, the resin containing fiber raw material may be formed at right angles, as shown in FIG. 15B.

Furthermore, in the above embodiments, cases in which a single die is wound around the mandrel were described, but a plurality of two or more die constituting members may be wound around the mandrel.

Further, in the above embodiments, the fiber reinforced plastic layer 12 is formed on the liner 11 in the vessel main body 10, but the fiber reinforced plastic layer 12 may be omitted such that the grid layer 20 is formed directly on the liner 11. In so doing, manufacturing costs are reduced greatly.

With respect to the above description, the contents of Japanese Patent Application No. 2009-88874 and Japanese Patent Application No. 2009-88877, with a filing date of Apr. 1, 2009 in Japan, are incorporated herein by reference.

Exclusive properties or features encompassed by the embodiments of this invention are as claimed below.

The invention claimed is:

1. A pressure vessel structure comprising:
    a vessel main body; and
    a grid layer provided on a periphery of the vessel main body and including a plurality of grid lines,
        wherein a first grid line of the plurality of grid lines comprises strip-form raw materials stacked up on a first line,
        wherein a second grid line of the plurality of grid lines comprises strip-form raw materials stacked up on a second line,
        wherein the strip-form raw materials of the first grid line and the strip-form raw materials of the second grid line are stacked up alternately at an intersection of the first grid line and the second grid line, and
        wherein the vessel main body comprises a fiber layer including first helically wound fibers having a fiber direction that is substantially orthogonal to a first helically wound grid line of the grid layer, and second helically wound fibers having a fiber direction that is substantially orthogonal to a second helically wound grid line of the grid layer.

2. The pressure vessel structure as defined in claim 1, wherein:
    the plurality of grid lines comprises the first helically wound grid line, the second helically wound grid line, and a hoop wound grid line,
    strip-form raw materials of the first helically wound grid line and strip-form raw materials of the second helically wound grid line are stacked up alternately at a first intersection at which the first helically wound grid line and the second helically wound grid line intersect,
    the strip-form raw materials of the first helically wound grid line and the strip-form raw materials of the hoop wound grid line are stacked up alternately at a second intersection differing from the first intersection, and
    the strip-form raw materials of the second helically wound grid line and strip-form raw materials of the hoop wound grid line are stacked up alternately at a third intersection differing from the first and second intersections.

3. The pressure vessel structure as defined in claim 1, wherein:
    the plurality of grid lines comprises the first helically wound grid line, the second helically wound grid line and a hoop wound grid line, and
    strip-form raw materials of the first helically wound grid line, strip-form raw materials of the second helically wound grid line, and strip-form raw materials of the hoop wound grid line are stacked up alternately at an intersection of the first helically wound grid line, the second helically wound grid line, and the hoop wound grid line.

4. The pressure vessel structure as defined in claim 1, wherein the grid layer including the plurality of grid lines is provided on at least a part of a hemispherical shell-shaped portion of the vessel main body in addition to a trunk portion.

5. The pressure vessel structure as defined in claim 1, wherein the vessel main body is made of resin.

* * * * *